(12) United States Patent
Shearon

(10) Patent No.: US 6,738,273 B2
(45) Date of Patent: May 18, 2004

(54) CHARGE PUMP DRIVE SIGNAL RECOVERY CIRCUIT

(75) Inventor: William Brandes Shearon, Findlay, OH (US)

(73) Assignee: Intersil Americas Inc., Milpitis, CA (US)

( * ) Notice: Subject to any disclaimer, the term of this patent is extended or adjusted under 35 U.S.C. 154(b) by 0 days.

(21) Appl. No.: 10/267,420

(22) Filed: Oct. 9, 2002

(65) Prior Publication Data

US 2004/0070999 A1 Apr. 15, 2004

(51) Int. Cl.[7] .............................................. H02M 3/18
(52) U.S. Cl. ...................... 363/60; 307/109; 327/536
(58) Field of Search .......................... 363/59, 60, 61; 307/109, 110; 327/536

(56) References Cited

U.S. PATENT DOCUMENTS

| | | | |
|---|---|---|---|
| 5,635,776 A | 6/1997 | Imi | 307/110 |
| 6,184,594 B1 * | 2/2001 | Kushnarenko | 307/109 |
| 6,249,446 B1 | 6/2001 | Shearon et al. | 363/59 |
| 6,486,728 B2 * | 11/2002 | Kleveland | 327/536 |
| 6,605,985 B2 * | 8/2003 | Pagliato et al. | 327/536 |

* cited by examiner

*Primary Examiner*—Adolf Berhane
(74) *Attorney, Agent, or Firm*—Allen, Dyer, Doppelt Milbrath & Gilchrist, P.A.

(57) ABSTRACT

At least upper order stages of a multi-stage charge pump contain respective drive signal recovery circuits, that enable the charge pump to operate over a larger voltage range and/or be driven by a very small input voltage. The switch control signal recovery circuit has an auxiliary NFET switch whose current flow path is series-coupled with a Schottky diode between the output voltage of the next lower order stage and a PFET switch drive line. The auxiliary switch controllably clamps the PFET switch drive line at a voltage that differs from the output voltage of the next lower order charge pump stage by the voltage drop across the Schottky diode. This effectively guarantees that the level-shifted line of that stage's transient clamp network will be biased to its appropriate operating voltage level, so that the clamp rail of this stage cannot hang up at a voltage level that is well below the output voltage from the next lower order stage.

16 Claims, 2 Drawing Sheets

CHARGE PUMP DRIVE SIGNAL RECOVERY CIRCUIT

FIELD OF THE INVENTION

The present invention relates in general to electronic circuits and components therefor, and is particularly directed to a new and improved multi-stage charge pump, one or more cascaded stages of which incorporate respective drive signal recovery circuits, that enable the charge pump to operate over a larger voltage range and/or be referenced to a very small input voltage.

BACKGROUND OF THE INVENTION

Electrical power for integrated circuits are typically supplied by one or more direct current (DC) power sources. In a number of applications the circuit may require one or more operating voltages that are different from the available supply voltage (which may be relatively low e.g., on the order of three volts or less). For example, memory devices such FLASH EEPROMs typically require a relatively high voltage to perform read and write operations. Another example is the increased complexity of video boards used in present day computers, which typically require that multiple power supplies operating at differing voltages be available on a single card. Because it is often not feasible to install additional power sources, many circuit designs incorporate charge pump circuits to generate higher local-use supply voltages.

A typical charge pump stage contains one or more pumping capacitors that are selectively charged and discharged through a series of selectively controlled switches to boost the supply voltage and thereby provide a higher output voltage. The number of charge pump stages may be increased or cascaded to correspondingly the multiply the supply voltage to high output values. An example of such a charge pump circuit is disclosed in the U.S. Pat. to Imi, No. 5,635,776 entitled "Charge Pump Voltage Converter."

While a charge pump architecture of the type described in the Imi patent can provide a significant voltage boost, its use may not be feasible in applications where very little supply current is available, due to the fact that too much supply current is consumed during the generation of the switch control signals. Similarly, other prior art charge pump circuits that use multiple oscillators or other clock sources to provide the switch control signals may not be adequate where low current consumption is desirable, such as in portable, battery-powered devices.

Advantageously, this low current consumption issue is successfully addressed by the charge pump architecture disclosed in the U.S. Pat. to W. Shearon et al, No. 6,249,446 B1 (hereinafter referred to as the '446 patent), entitled: "Cascadable, High Efficiency Charge Pump Circuit and Related Methods," issued Jun. 19, 2001, assigned to the assignee of the present application and the disclosure of which is incorporated herein.

The general architecture of a times-two (X2) voltage multiplier charge pump circuit according to the invention disclosed in the '446 patent is diagrammatically illustrated at 10 in FIG. 1. This charge pump is a two-phase charge pump in that first and second charge-pumping capacitors 11 and 12 perform the same function but operate out of phase with one another. This redundancy serves to improve the efficiency of the charge pump. The first charge-pumping capacitor 11 is connected to a first set of switches 13, 14, 15, 16, while the second charge-pumping capacitor 12 is connected to a second set of switches 17, 18, 19, 20.

The switches 13–20 are driven by first and second sets of switch control signals ($\Phi 1$–$\Phi 4$ and $\Phi 1a$–$\Phi 4a$, respectively) having non-overlapping phases, generated by a controller 23. Switches 14, 18, 16, 20 may comprise PFETs and switches 13, 17, 15, 19 may comprise NFETS, for example. In this case, the control logic polarity for switches 14, 18, 16, 20 is opposite that of switches 13, 17, 15, 19. As shown by the switching signal waveforms adjacent to the $\Phi 1$, $\Phi 2$, $\Phi 3$ and $\Phi 4$ outputs of a clock generator 29 of a controller 23, the on-state control signals for the switches do not overlap, so as to prevent switches 13 and 14 from being turned on at the same time. Likewise, the switch pairs 17, 18, 15, 16 and 19, 20 are controlled so as to not be on at the same time, so as to avoid diminishing the operating efficiency of the charge pump.

In addition to clock generator 29, controller 23 includes a transient clamp network 24 (which may be configured as shown in FIG. 2) having outputs which provide the second set of switch control signals $\Phi 1a$–$\Phi 4a$. A first level-shifting capacitor 25 is connected between the $\Phi 1$ output of the clock generator 29 and the $\Phi 1a$ output of the transient clamp network. Similarly, a second level-shifting capacitor 26 is connected between the $\Phi 2$ and $\Phi 2a$ outputs, a third level-shifting capacitor 27 is connected between the $\Phi 3$ and ($\Phi 3a$ outputs, and a fourth level-shifting capacitor 28 is connected between the $\Phi 4$ and $\Phi 4a$ outputs.

The level-shifting capacitors 25, 26, 27, 28 cooperate with the transient clamp network 24, so that the second set of phase control signals is level-shifted relative to the first set of phase control signals. That is, the four switch control signals $\Phi 1$–$\Phi 4$ are coupled through the level-shifting capacitors 25, 26, 27, 28 to the transient clamp network. The transient clamp network 24 provides proper DC biasing, or auto-zeroing, on the non-driven side of the level-shifting capacitors.

As shown in FIG. 2, the transient clamp network 24 may include a set of four clamping, MOS transistors 31, 32, 33, 34. Transistor 31 is connected at its source to VOUT, its drain to $\Phi 1a$, and its gate to $\Phi 3a$. Transistor 32 is connected at its source to VOUT, its drain to $\Phi 3a$, and its gate to $\Phi 1a$. Transistor 33 is connected at its drain $\Phi 2a$, its source to Vdd and its gate to $\Phi 4a$. Transistor 34 is connected at its drain to $\Phi 4a$, its source to Vdd and its gate to $\Phi 2a$.

The charge pump circuit 10 derives its power from a supply voltage Vdd at the input-supply side of the level-shifting capacitors 25, 26, 27, 28, and therefore uses nearly none of the developed output power. The four switch control signals $\Phi 1$–$\Phi 4$ and their level-shifted counterparts $\Phi 1a$–$\Phi 4a$ control the switches 13–20, such that the two charge-pumping capacitors 11, 12 are alternatingly charged and discharged, to provide a multiplied output voltage VOUT.

As pointed out above, the first set of switch control signals includes a first pair of non-overlapping, switch control signals $\Phi 1$, $\Phi 2$ having opposite relative phases, and a second pair of switch control signals $\Phi 3$, $\Phi 4$, that do not overlap the first pair. The switch control signals $\Phi 3$, $\Phi 4$ also have phases opposite to one another. Because there is no overlap of the switch control signals between $\Phi 1$, $\Phi 2$ and $\Phi 3$, $\Phi 4$, and nearly no explicit current usage on the non-driven side of the level-shifting capacitors 25, 26, 27, 28, the charge pump circuit 10 operates with very high voltage conversion efficiency and power conversion efficiency, making it more efficient than conventional charge pump circuits under the same conditions.

As further described in the '466 patent, the basic (X2) charge pump architecture of FIG. 1 may be expanded in a cascaded-stage fashion to provide higher orders of voltage multiplication of the supply voltage Vdd to X3, X4, ... XN. FIG. 3 of the '466 patent shows a non-limiting example of providing an additional charge pump stage (containing an additional pair of charge pump capacitors and associated charge—discharge switches) to realize X3 voltage multiplication. Now, although the same current conservation functionality of the architecture of FIG. 1 is realized for such higher order implementations, the present inventor has discovered a potential latch-up problem associated with the operation of the higher level voltage stages (e.g., X3 and above), particularly for low supply voltage applications.

In particular, it has been observed that where the supply voltage (Vdd) is very low (e.g., on the order of two to three volts or less—a not uncommon situation for portable device applications), a respective higher order stage of the charge pump can 'wake-up' or be provoked into a state where one of the clamp rails of its transient clamp network is unable to be sufficiently biased to its appropriate operating voltage level. As a result, the clamp rail of this stage becomes 'stuck' substantially below the Xi output voltage provided by the immediately preceding lower order stage (for example, the iXP2 drive to the PFET transistor for the polarities of the circuit components of the charge pump of FIG. 1). At low voltage and high impedance, the charge pump is unable to develop sufficient gate-source voltage bias (Vgs) on the faulty device's complement to pull it up to the required voltage level.

SUMMARY OF THE INVENTION

In accordance with the present invention, this problem is effectively obviated by augmenting at least upper level stages of the charge pump with respective drive signal recovery circuits. The drive signal recovery circuit of the present invention is operative to controllably clamp the affected level-shifted drive signal at a voltage sufficiently close to output voltage of the next lower (in cascaded voltage multiplication order) charge pump stage as to prevent the clamp rail from 'hanging up' at a reduced voltage. By reduced voltage is meant a voltage that would otherwise be too low for that stage of the charge pump to develop sufficient gate-source voltage bias (Vgs) on the faulty device's complement to pull it up to the required voltage level.

As will be described, the switch control signal recovery circuit of the invention has an input terminal coupled to receive the output voltage of the immediately lower order charge pump stage, and an output terminal coupled to receive a first polarity, level-shifted switch control signal at one of the second outputs of the transient clamp network. Operation of the switch control signal recovery circuit is controlled by the second (complementary) polarity level-shifted switch control signal at another of the second outputs of the transient clamp network.

In a non-limiting, preferred embodiment, for the case of a positive polarity voltage, the switch control signal recovery circuit may comprise an auxiliary NFET switch (of opposite polarity to the clamped PFET), and having its (source-drain) current flow path series-coupled with a diode (such as a Schottky diode) between the input and output terminals of the recovery circuit. The gate of the auxiliary NFET switch is coupled to receive the complementary polarity level-shifted switch control signal during the off time of the clamped PFET.

When the auxiliary NFET switch is turned on by the complementary polarity level-shifted (NFET) switch control signal, it bias-clamps the level-shifted switch control rail at an augmented clamping voltage that effectively differs from the output voltage of the lower order charge pump stage by only the voltage drop across the Schottky diode. Because this augmented clamping voltage is very close to the output voltage of the next lower charge pump stage, it effectively ensures that sufficient gate-source voltage bias (Vgs) will be applied to the affected PFET switch to pull the level-shifted switching signal rail up to the required voltage level. As a consequence, a multi-stage charge pump incorporating the switch control signal recovery circuit of the invention is able to operate over a larger voltage range and/or be referenced to a very small input voltage.

DETAILED DESCRIPTION

Before describing a non-limiting, but preferred embodiment of the switch control signal recovery circuit of the present invention, it should be observed that the invention resides primarily in an arrangement of conventional circuit components, and how they may be incorporated into a multi-stage charge pump architecture of the type described in the above-referenced '466 patent. Moreover, it is to be understood that the invention may be embodied in a variety of other implementations, and should not be construed as being limited to only the embodiment shown and described herein. Rather, the implementation example shown and described herein is intended to supply only those specifics that are pertinent to the present invention, so as not to obscure the disclosure with details that are readily apparent to one skilled in the art having the benefit of present description. Throughout the text and drawings like numbers refer to like elements.

Figure 3:
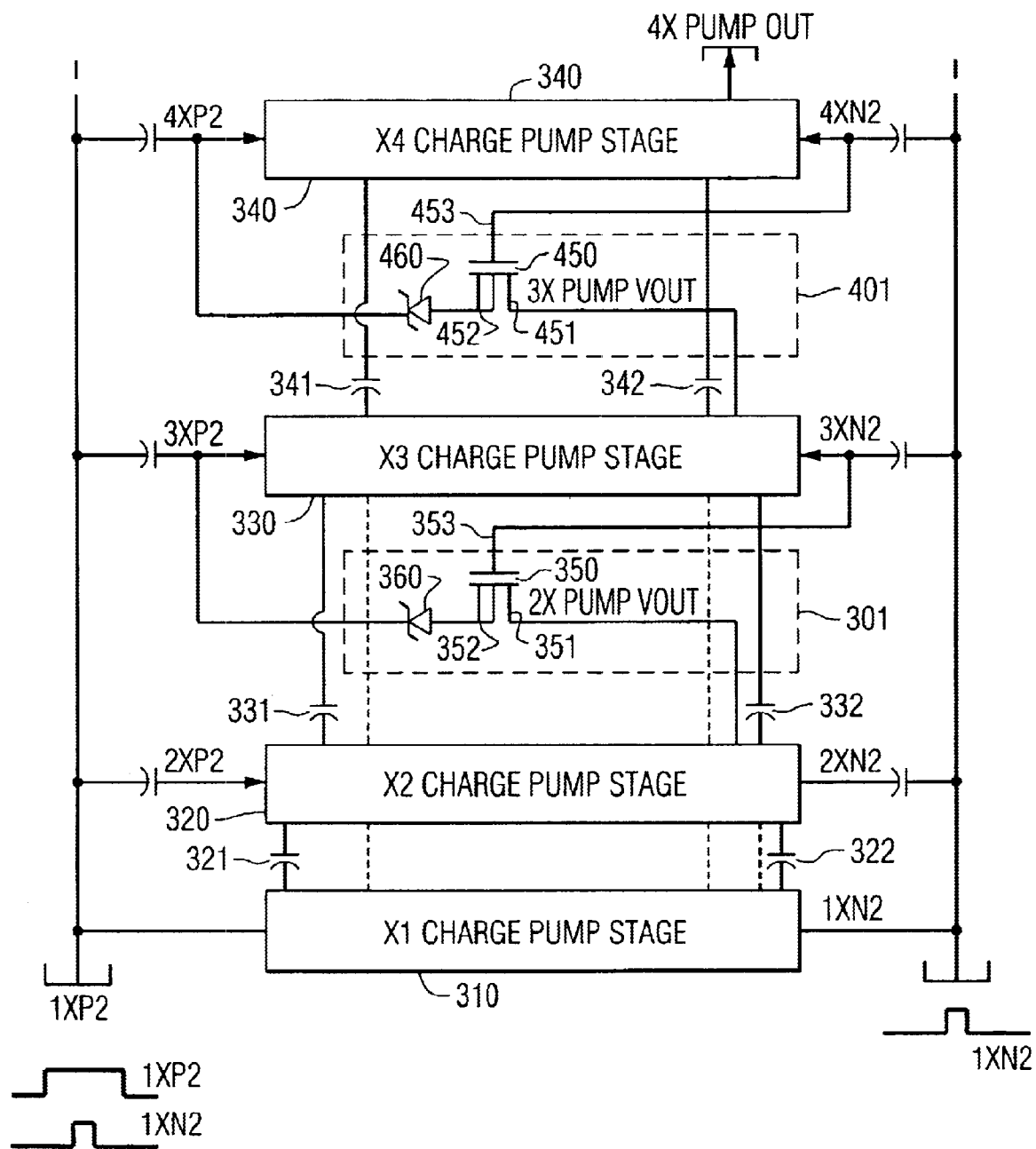
FIG. 3 diagrammatically illustrates the switch control signal recovery circuit of the present invention, and the manner in which it is incorporatable into a respective iXP2/iXN2 phase section of successive stages of a multi-stage charge pump of the type disclosed in the '466 patent.

Attention is now directed to FIG. 3, which diagrammatically illustrates the switch control signal recovery circuit of the present invention, and the manner in which it is incorporatable into a respective iXP2/iXN2 phase section of successive stages of a multistage charge pump of the type disclosed in the '466 patent, described above. To reduce the complexity of the drawing, FIG. 3 shows respective switch control signal recovery circuits 301 and 401, coupled with the XP2/XN2 phase section of the 3X and 4X stages of a four stage architecture containing a set of four cascaded charge pump stages 310, 320, 330 and 340, configured as in the '466 patent.

Figure 1:
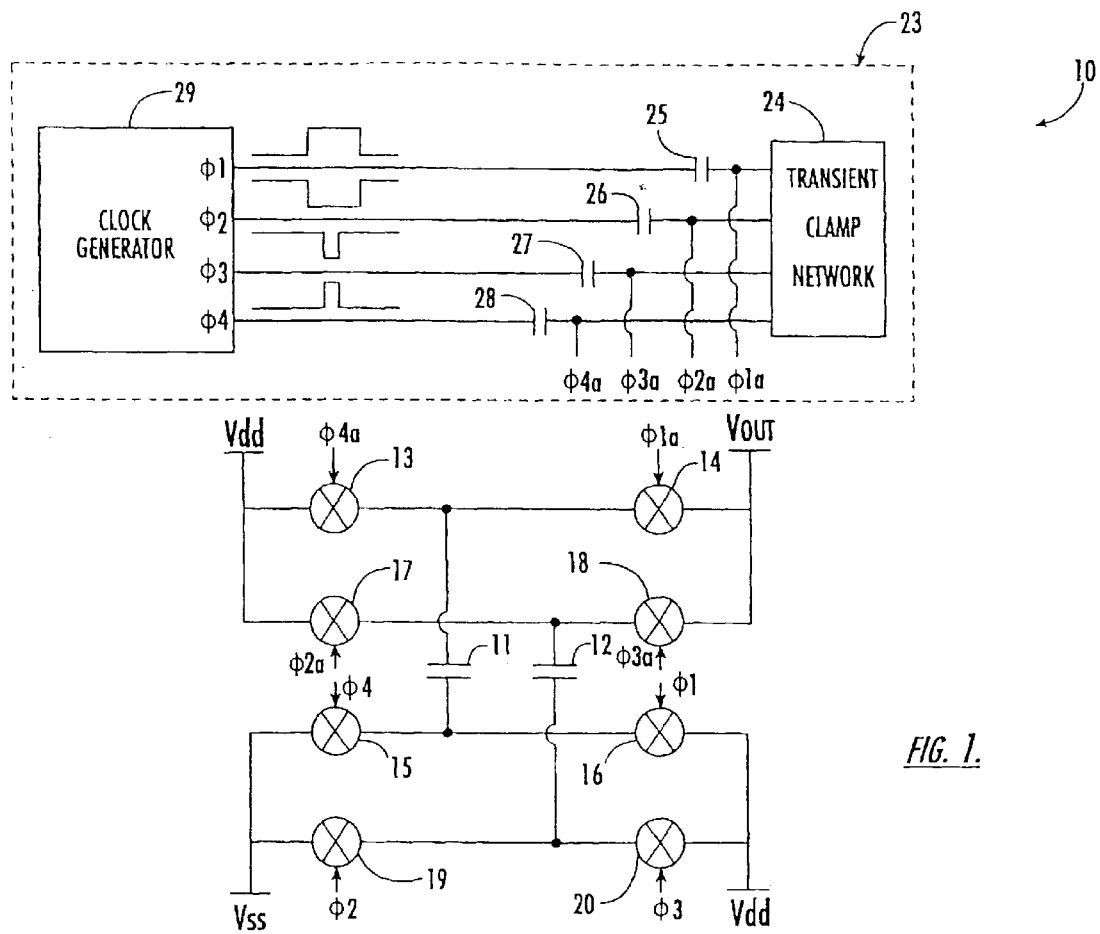
FIG. 1 diagrammatically illustrates the general architecture of a charge pump circuit according to the invention disclosed in the '446 patent.
Figure 2:
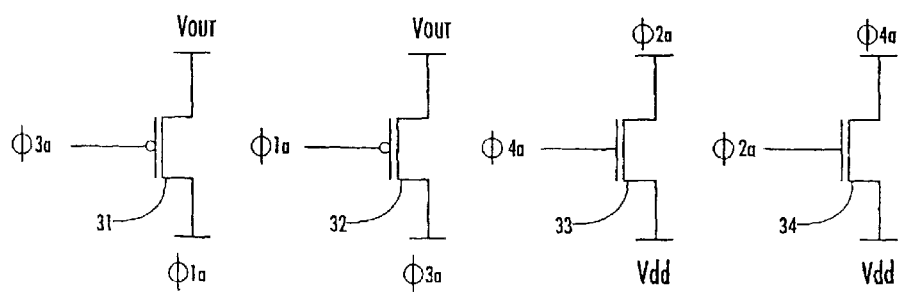
FIG. 2 is a schematic diagram of transient clamp network of the charge pump circuit of FIG. 1.

While the '466 patent does not explicitly show a four-stage embodiment, its does describe the cascading of successive stages to realize higher order stage implementations, such as the cascading of an additional stage onto the two stage embodiment of FIG. 1 to realize the three stage pump of the patent. In the diagrammatic illustration of a four stage charge pump in FIG. 3, it will be readily appreciated by one skilled in the art that the fourth stage 340 contains additional sets of complementary phase switches that couple to associated capacitors 341, 342 referenced to the first stage 310, in the same manner as in the associated pairs of complementary phase capacitors 321, 322 and 331, 332 for the second and stages 320 and 330, respectively.

It is to be understood that each of the XP1/XN1 phase sections of the 3X and 4X stages are also coupled with their own associated switch control signal recovery circuits, connected to the 3XP1/3XN1 and 4XP1/4XN1 lines and respective 2X and 3X pump supply ports, in the same manner that switch control signal recovery circuits 301 and 401 are coupled with the XP2/XN2 phase section of the 3X and 4X pump stages 330 and 340, respectively.

As pointed out above, as the pull-up problem solved by the signal recovery circuit has been found to occur in the X3 stage and higher, it is not shown in FIG. 3 as being incorporated with the respective X1 and X2 stages 310 and 320. However, as its inclusion with these lower order stages is not detrimental to their operation, it may be expected that an integrated circuit designer would incorporate it in such stages from a standpoint of overall symmetry and practicality of computer aided design and manufacture. It should also be understood that where the charge pump includes one or more higher order (e.g., X5, X6, . . . , XN) charge pump stages, those additional stages will also contain a respective copy of the switch control signal recovery circuit of the invention, connected in each stage in the same manner as shown in FIG. 3.

For the present example of a positive polarity voltage charge pump, the X3 stage switch control signal recovery circuit 301 is shown as comprising an auxiliary NFET switch 350 having its source 351 coupled to the 2XVOUT supply line (2X Pump Supply) from the next lower order charge pump stage 320 and its drain 352 series-coupled with a Schottky diode 360 to the level-shifted switch control signal line 3XP2. The gate 353 of the auxiliary NFET switch 350 is coupled to the level-shifted switch control signal line 3XN2. Likewise, the X4 stage switch control signal recovery circuit 4 has an auxiliary NFET switch 450, whose source 451 is coupled to the 3XVOUT supply line (3X Pump Supply) from the next lower order charge pump stage 330 and its drain 452 series-coupled with a Schottky diode 460 to the level-shifted switch control signal line 4XP2. The gate 453 of the auxiliary NFET switch 450 is coupled to the level-shifted switch control signal line 4XN2.

In operation, when the auxiliary NFET switch 350/450 is turned on by its associated polarity level-shifted (NFET) switch control signal 3XN2/4XN2, it bias-clamps the opposite polarity level-shifted switch control line 3XP2/4XP2 at voltage that effectively differs from the output voltage 2XVOUT/3XVOUT of the next lower order charge pump stage 320/330 by only the voltage drop across the Schottky diode 360/460. Thus, the bias voltage corresponds substantially to the output voltage of the next lower order charge pump stage, and thereby effectively ensures that sufficient gate-source voltage bias (Vgs) will be applied to the affected PFET switch to pull the level-shifted switching signal rail 3XP2/4XP2 up to the required voltage level.

As a result, even where the charge pump is powered by a very low supply voltage, such as one on the order of two to three volts or less, the switch control signal recovery circuit of the invention effectively guarantees that the level-shifted line of that stages's transient clamp network will be biased to its appropriate operating voltage level. Therefore, the clamp rail of this stage cannot hang up at a voltage level that is well below the Xi output voltage from the preceding lower order stage. This means that for low voltage and high impedance applications, the charge pump will always be able to develop sufficient gate-source voltage bias (Vgs) on the switching device's complement to pull it up to the required voltage level.

While I have shown and described an embodiment in accordance with the present invention, it is to be understood that the same is not limited thereto but is susceptible to numerous changes and modifications as known to a person skilled in the art, and I therefore do not wish to be limited to the details shown and described herein, but intend to cover all such changes and modifications as are obvious to one of ordinary skill in the art.

What is claimed is:

1. A multi-stage charge pump circuit having a plurality of charge pump stages coupled in cascade to produce a multiplied output voltage that is a prescribed multiple of an input voltage, a respective charge pump stage comprising:

at least one pumping capacitor;

a plurality of switches connected to said at least one pumping capacitor;

a controller for generating first and second sets of switch control signals for controlling said plurality of switches, so that said at least one pumping capacitor generates an increased output voltage that is a multiple of said input voltage, said first set of switch control signals being based upon said input voltage, and said second set of switch control signals being level-shifted from said first set of switch control signals; and a switch control signal recovery circuit that is operative to controllably clamp a signal transport path of a second switch control signal at a voltage approximately equal to the output voltage of a next lower order charge pump stage.

2. The multi-stage charge pump circuit according to claim 1, wherein said controller includes:

a clock signal generator having first outputs for said first set of switch control signals, a transient clamp network having second outputs for said second set of switch control signals, and a respective level-shifting capacitor connected between each first output and a corresponding second output and cooperating with said transient clamp network, so that said second set of switch control signals is level-shifted from said first set of switch control signals, and wherein said switch control signal recovery circuit is operative to controllably clamp a second output of said transient clamp network at said voltage approximately equal to said output voltage of said next lower order charge pump stage.

3. The multi-stage charge pump circuit according to claim 2, wherein said switch control signal recovery circuit has an input terminal coupled to receive the output voltage of the next lower order charge pump stage, an output terminal coupled to one of the second outputs of said transient clamp network, and a control terminal coupled to another of the second outputs of said transient clamp network, said switch control signal recovery circuit being operative to controllably clamp said output terminal, and thereby said one of the second outputs of said transient clamp network, at a voltage approximately equal to said output voltage of said next lower order charge pump stage.

4. The multi-stage charge pump circuit according to claim 3 wherein said switch control signal recovery circuit is operative to clamp said one of the second outputs of said transient clamp network at said voltage approximately equal to said output voltage of said next lower order charge pump stage, in response to said another of the second outputs being applied to said control terminal.

5. The multi-stage charge pump circuit according to claim 4, wherein said switch control signal recovery circuit comprises an auxiliary switch having a current flow path therethrough series-coupled with a diode between said input and output terminals, said auxiliary switch having a switch control terminal thereof coupled to said control terminal, whereby said auxiliary clamp circuit, in to said another of the second outputs being applied to said control terminal, is operative to clamp said output terminal at a voltage that differs from the output voltage of the next lower order charge pump stage by approximately the voltage drop across said diode.

6. The multi-stage charge pump circuit according to claim 5, wherein said diode comprises a Schottky diode.

7. The multi-stage charge pump circuit according to claim 1, wherein said first set of switch control signals comprises a first pair of control signals having opposite relative phases and a second pair of control signals having opposite relative phases, and non-overlapping with said first pair of control signals.

8. In a multi-stage charge pump circuit having a plurality of charge pump stages coupled in cascade to produce a multiplied output voltage that is a prescribed multiple of an input voltage, a respective charge pump stage containing at least one pumping capacitor, a plurality of switches connected to said at least one pumping capacitor, and a controller, said controller being operative to generate first and second sets of switch control signals for controlling said plurality of switches, so that said at least one pumping capacitor generates an increased output voltage that is a multiple of said input voltage, said first set of switch control signals being based upon said input voltage, and said second set of switch control signals being level-shifted from said first set of switch control signals, the improvement wherein said respective charge pump stage further includes:
  an auxiliary clamp circuit having an input terminal coupled to an output voltage terminal of the next lower order charge pump stage, an output terminal coupled to a first output of said transient clamp network, and a control terminal coupled to a second output of said transient clamp network, said auxiliary clamp circuit being operative, in response to a switch control signal being applied to said control terminal, to clamp the output terminal of said auxiliary clamp circuit at a voltage approximately equal to the output voltage of the next lower order charge pump stage.

9. The improvement according to claim 8, wherein said auxiliary clamp circuit comprises an auxiliary switch having a current flow path therethrough series-coupled with a diode between said input and output terminals of said auxiliary clamp circuit, said auxiliary switch having a switch control terminal thereof coupled to said control terminal of said auxiliary clamp circuit, whereby said auxiliary clamp circuit, in response to a switch control signal being applied to said switch control terminal, is operative to clamp the output terminal thereof at a voltage that differs from the output voltage of the next lower order charge pump stage by approximately the voltage drop across said diode.

10. The improvement according to claim 9, wherein said diode comprises a Schottky diode.

11. A method of operating a multi-stage charge pump circuit having a plurality of charge pump stages coupled in cascade to produce a multiplied output voltage that is a prescribed multiple of an input voltage,
  a respective charge pump stage including at least one pumping capacitor, a plurality of switches connected to said at least one pumping capacitor, and a controller for generating first and second sets of switch control signals for controlling said plurality of switches, so that said at least one pumping capacitor generates an increased output voltage that is a multiple of said input voltage, said first set of switch control signals being based upon said input voltage, and said second set of switch control signals being level-shifted from said first set of switch control signals,
  said method comprising the steps of:
    (a) providing one or more switch control signal recovery circuits each of which is operative to controllably clamp a signal transport path of a second switch control signal at a voltage approximately equal to the output voltage of a next lower order charge pump stage; and
    (b) coupling one or more stages of said charge pump with a respective switch control signal recovery circuit provided in step (a), and causing one of more switch control signal recovery circuits to controllably clamp a level-shifted drive signal at a voltage sufficiently close to the output voltage of the next lower charge pump stage.

12. The method according to claim 11, wherein said controller includes a clock signal generator having first outputs for said first set of switch control signals, a transient clamp network having second outputs for said second set of switch control signals, and a respective level-shifting capacitor connected between each first output and a corresponding second output and cooperating with said transient clamp network, so that said second set of switch control signals is level-shifted from said first set of switch control signals, and wherein
  step (b) comprises causing said switch control signal recovery circuit to controllably clamp a second output of said transient clamp network at said voltage approximately equal to said output voltage of said next lower order charge pump stage.

13. The method according to claim 1, wherein said switch control signal recovery circuit has an input terminal coupled to receive the output voltage of the next lower order charge pump stage, an output terminal coupled to one of the second outputs of said transient clamp network, and a control terminal coupled to another of the second outputs of said transient clamp network, said switch control signal recovery circuit being operative to controllably clamp said output terminal, and thereby said one of the second outputs of said transient clamp network, at a voltage approximately equal to said output voltage of said next lower order charge pump stage.

14. The method according to claim 13, wherein said switch control signal recovery circuit is operative to clamp said one of the second outputs of said transient clamp network at said voltage approximately equal to said output voltage of said next lower order charge pump stage, in response to said another of the second outputs being applied to said control terminal.

15. The method according to claim 14, wherein said switch control signal recovery circuit comprises an auxiliary switch having a current flow path therethrough series-coupled with a diode between said input and output terminals, said auxiliary switch having a switch control terminal thereof coupled to said control terminal, whereby said auxiliary clamp circuit, in to said another of the second outputs being applied to said control terminal, is operative to clamp said output terminal at a voltage that differs from the output voltage of the next lower order charge pump stage by approximately the voltage drop across said diode.

16. The method according to claim 15, wherein said diode comprises a Schottky diode.

\* \* \* \* \*